Patented Apr. 25, 1950

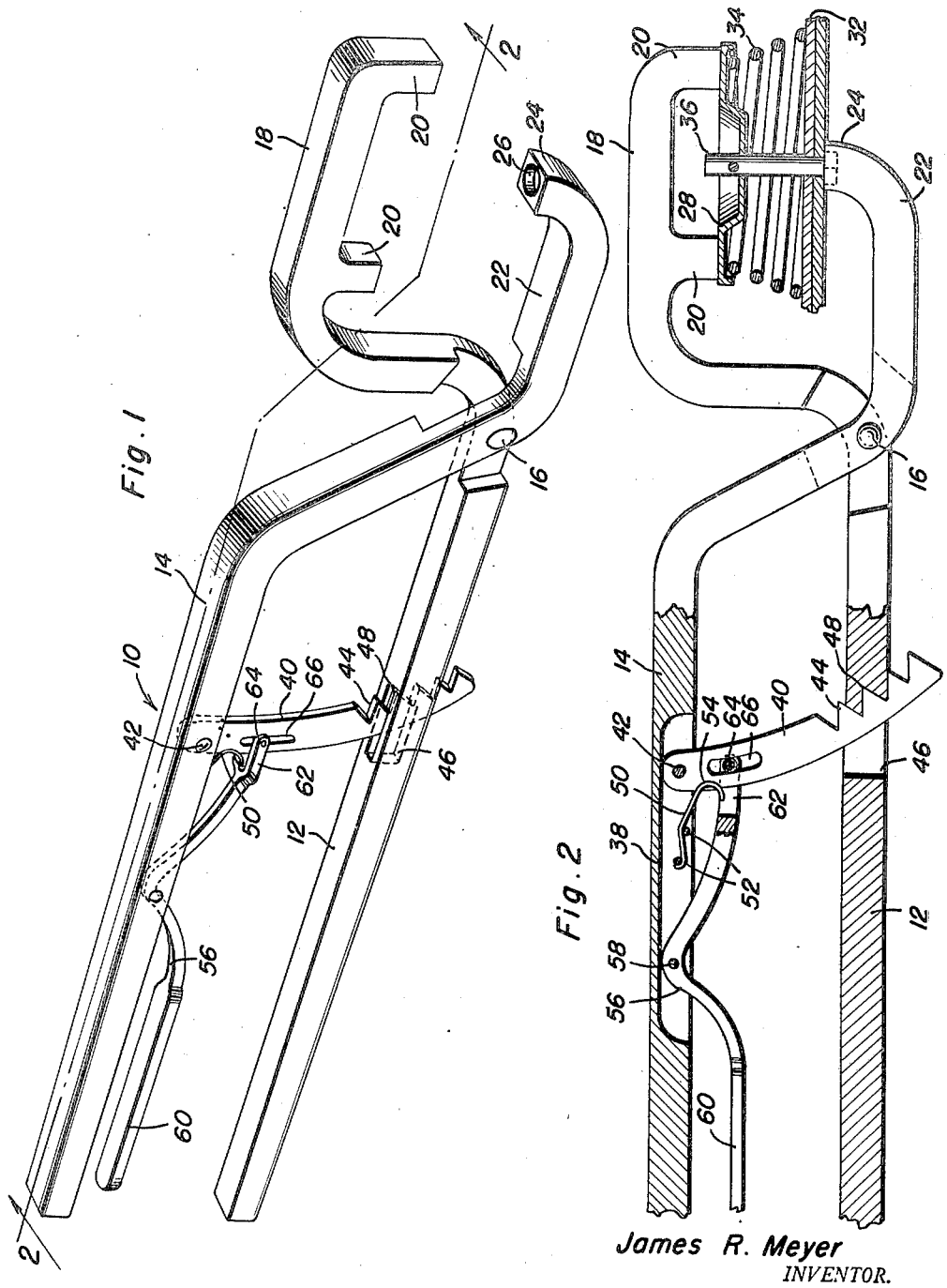

2,505,564

UNITED STATES PATENT OFFICE 2,505,564

FRICTION PIN SPRING COMPRESSOR PLIER CONSTRUCTION

James R. Meyer, Sioux City, Iowa

Application August 23, 1948, Serial No. 45,645

1 Claim. (Cl. 29—283)

This invention relates to a manually operable tool the primary object of which is to compress the friction pin spring while assembling brake shoes and brake shoe links permitting the installation of the friction pin lock.

Another object of this invention is to provide a hand-operative tool for use in installing and removing the brake-retracting springs associated with the brake shoes of internally expanding service brakes of an automobile, or truck.

Yet another object of this invention is to provide a manually operable tool whereby the springs employed in retracting brake shoes may be readily and quickly compressed and retained in any desired degree of compression in a locked position permitting the operator or mechanic the free use of both of his hands to install the friction pin lock.

These, together with various ancillary objects and features of the invention which will later become apparent as the following description proceeds, are attained by the device, a preferred embodiment of which has been illustrated by way of example only in the accompanying drawings, wherein:

Figure 1 is a perspective view of the device of the instant invention; and

Figure 2 is a longitudinal sectional view taken substantially in the plane of section line 2—2 of Figure 1.

Specific reference is now made to the drawings. In the several views in the accompanying drawings and in the following specification reference characters indicate corresponding elements throughout.

The device of the instant invention generally indicated at 10 consists of a fixed lever 12 and a movable lever 14 pivoted thereto in a conventional manner by means of a pivot pin 16. As will be seen from the drawings, the levers are substantially rectangular in cross section and arcuated in a manner well known to the art. Terminally secured to or integral with the fixed lever 12 is a jaw 18 which is further provided with a pair of spaced depending shoulders 20. The movable lever 14 is also provided with an opposed jaw 22 having an arcuated portion 24 which is further provided with a recess 26 therein. As will be seen in Figure 2, the shoulders 20 provide a bearing surface for a brake shoe link 28 while the arcuated portion 24 of the jaw 22 provides a surface for supporting another brake shoe link or links 32 between which links are positioned a spring 34 to be compressed between the jaws.

The friction pin 36 is retained at one of its ends in the slot 26.

The movable lever 14 is further provided with a channel shaped groove 38 in which is positioned a link 40 which is pivoted to the lever 14 by means of a pivot pin 42. The link 40 is somewhat arcuated and is provided at its free end with a series of teeth or serrations 44. The toothed end of the link 40 extends through a longitudinally extending slot 46 which is shaped to provide an inclined side wall 48 for selectively engaging one of the teeth 44.

A means is provided for normally urging the link 40 into locked engagement with the side walls 48 of the slot 46 which means consists of a leaf spring 50 which at one end is removably retained upon the movable lever 14 by means of lugs 52 and which is provided at the other end with an arcuate portion 54 which is biased against the edge of the link 40 adjacent its pivot point 42.

Thus, when the levers 12 and 14 are compressed by hand the spring 34 is similarly compressed and the levers are retained in a locked position when the teeth 44 of the link 40 engage the inclined wall 48 of the slot 46. Thereafter, the mechanic with both hands free, can proceed to install the friction pin 36.

To release or unlock the link 40, a lever arm 56 is provided which is pivoted intermediate its ends by means of a pivot pin 58 to the lever 14 and is consequently provided with a longitudinally extending handle portion 60. At the other end of the handle portion 60, the lever arm 56 is bifurcated as at 62 and between the furcations the pivot pin 64 is provided which extends through an elongated slot 66 in the link 40. Thus when the handle portion 60 is compressed, the lever arm 56 pulls the link 40 away from the inclined side wall 48 of the slot 46.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A plier construction comprising a first and a second lever pivoted to each other, an arcuate link pivoted to said second lever having teeth at the free end thereof, a slot in said first lever having an inclined side wall for engaging a selected one of said teeth, resilient means normally urging said teeth into engagement with the inclined side wall of said slot, and means for releasing said levers, said means including a lever arm pivoted intermediate its ends to said second lever, said arm having a handle at one end and a bifurcated portion at the other end, a longitudinal slot in said link, and a pin carried between the furcations of said bifurcated portion and extending through said link slot.

JAMES R. MEYER.

REFERENCES CITED

The following references are of record in the file of this patent:

UNITED STATES PATENTS

| Number | Name | Date |
|---|---|---|
| 251,825 | Bruhl | Jan. 3, 1882 |
| 1,447,560 | Mares | Mar. 6, 1923 |
| 1,608,883 | Justus | Nov. 30, 1926 |
| 1,734,420 | Curtis | Nov. 5, 1929 |
| 2,439,785 | Feitl | Apr. 13, 1948 |